Patented Feb. 14, 1928.

1,658,974

UNITED STATES PATENT OFFICE.

ANTOINE V. DE LAPORTE, FREDERICK A. DALLYN, AND FREDERICK R. MANUEL, OF TORONTO, ONTARIO, CANADA; SAID DE LAPORTE AND SAID MANUEL ASSIGNORS TO SAID DALLYN.

METHOD OF PURIFYING SEWAGE AND ANALOGOUS LIQUIDS.

No Drawing.      Application filed April 12, 1926. Serial No. 101,543.

The problem of sewage disposal and the purification of sewage and otherwise contaminated water has for some years been the subject of much study and experimentation by chemical engineers and bacteriologists and many improvements have resulted in the treatment of such matters. It has, however, been generally accepted that the problem is biological and the most successful treatment to the present date is that known as the activated sludge treatment, in which solids containing bacteria and protozoal life are kept in constant contact with air forced into intimate association therewith to effect the ultimate transformation of the entire body to a state of purification.

Sewage and impure waters contain many objectionable substances in the form of solids, gases and sols including emulsoids and suspensoids and these are responsible for the presence of bacteria, colour, turbidity, odor, taste, corrosiveness and soap consuming qualities. These objectional substances are of both organic and inorganic origin and constitute, excreta, trade wastes, natural growths, minerals and gases dissolved from the air or from decomposing matter.

It is the object of this invention to remove the organic matter, some of the mineral substances, and the dissolved gases by chemical reaction and the principal feature of the invention consists in intimately mixing with the liquid mass a suitable floc which has the quality of adsorbing, precipitating, coagulating and oxidizing the substances present in the mass in the form of sols, emulsoids and suspensoids and even some solids.

According to the present invention a floc is produced from aluminium and iron salts and this is introduced in suitable quantity to the water or sewage in a suitable tank and the mass is thoroughly agitated either by mechanical means or by air under pressure or both. The effect produced by the thorough distribution of the floc is that the emulsoids and suspensoids contact with the jelly-like surface of the floc and the finely suspended or colloidal matter is either destroyed by oxidation or dispersed to a crystalloidal or gaseous state or it is adsorbed or coagulated by the floc.

It may be advantageous under some conditions to introduce oxygen and a sterilizing agent, such as chlorine, into the mass in order to ensure the oxidation of iron salts contained therein and some organic matter and also to blow off certain of the dissolved gases and volatile substances.

After a suitable retention period, which is relatively short, and during which the floc is kept intimately mixed with the mass under treatment, the clarified water is separated from the suspended matter by settling or filtering, or both.

The residue sludge, which contains the floc may then be returned in suitable quantity to the primary treatment tank to be mixed with further raw matter.

The residual sludge may require to be reconditioned before being introduced into a fresh quantity of matter depending on its state of oxidation. If it is poor in oxygen its introduction into the fresh matter will only depreciate the oxidizing effect of the air or other oxygen introduced into the mass, consequently the sludge in being returned to the repeating process is preferably thoroughly aerated.

All water contains more or less aluminum salts usually in the form of alumium hydrate and many waters contain iron salts and as the matrix of the desired floc is aluminum and iron salts, it is only necessary to supply a sufficient quantity of these elements to effect the commencement of the coalescence of the contained particles and the process may then continue almost indefinitely without further addition of such elements. It will thus be readily understood that the cost of operation will be reduced to the minimum.

It is found that a process such as described may be started instantaneously and operated at very high speed as comparatively very little time is required for the adsorption, precipitation and coagulation of the substances to be separated from the water. Further, it is found that temperature change, within reasonable limits, does not materially alter the results and even considerable increase in temperature may be offset by the addition of a sterilizing agent together with a further supply of the precipitating floc.

It will be understood that with a certain determined capacity such as the natural limitations of any plant, for adding oxygen to the mass being treated an abnormal increase of temperature will effect a very rapid development of organic decomposition and this may be offset by the addition of the sterilizing agent which will retard the development of such organisms and maintain the proper balance of the oxygen content. Such a condition is rendered possible by the fact that the present process is entirely chemical and not dependent on biological phenomena.

What we claim as our invention is:

1. A method of purifying sewage and analogous liquids consisting in associating with the liquid mass a floc the characteristic of which is to set up an oxidizing action therein while concurrently effecting the adsorption, coagulation and precipitation of the undesirable substances therein.

2. A method of purifying sewage and analogous liquids consisting in applying to the liquid mass a floc composed of aluminium and iron salts of such proportions as to bring about an oxidizing action in the mass and concurrently effect the adsorption, coagulation and precipitation of the undesirable substances therein.

3. A method of purifying sewage and analogous liquids consisting in applying to the liquid mass a floc composed of aluminium and iron salts of such proportions as to bring about an oxidizing action in the mass and concurrently effect the adsorption, coagulation and precipitation of the undesirable substances therein, and agitating and aerating the mass during such process to promote the said oxidizing action and to carry off the gases produced.

4. A method of purifying sewage and analogous liquids consisting in applying to the liquid mass a floc composed of aluminium hydrate and iron hydrate of such proportions as to bring about an oxidizing action in the mass and concurrently effect the adsorption, coagulation and precipitation of the undesirable substances therein.

5. A method of purifying sewage and analogous liquids consisting in associating with the liquid mass a floc composed of two elements one of said elements being adapted to set up an oxidizing action in said liquid mass to effect the removal of organic matter from the floc, the other element of said floc concurrently acting on said liquid mass to effect the adsorption, coagulation and precipitation of the remaining unoxidized undesirable substances therein, the entire mass during such process being thoroughly associated with oxygen to promote said oxidizing action and to carry off the gases produced thereby.

ANTOINE V. DE LAPORTE.
FREDERICK A. DALLYN.
FREDERICK R. MANUEL.